US012436210B1

United States Patent
Lin et al.

(10) Patent No.: US 12,436,210 B1
(45) Date of Patent: Oct. 7, 2025

(54) MAGNETIC MOMENT MEASUREMENT SYSTEM AND METHOD

(71) Applicant: Harbin Institute of Technology, Harbin (CN)

(72) Inventors: Shengxin Lin, Harbin (CN); Yi Li, Harbin (CN); Yuyang Bai, Harbin (CN); Guodong Xia, Harbin (CN); Shidong Shao, Harbin (CN); Jiahong Yang, Harbin (CN); Donghua Pan, Harbin (CN); Liyi Li, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 19/252,698

(22) Filed: Jun. 27, 2025

(30) Foreign Application Priority Data

Jan. 24, 2025 (CN) .......................... 202510115828.X

(51) Int. Cl.
*G01R 33/12* (2006.01)
*G01R 33/00* (2006.01)
*G01R 33/02* (2006.01)

(52) U.S. Cl.
CPC ......... *G01R 33/12* (2013.01); *G01R 33/0076* (2013.01); *G01R 33/0094* (2013.01); *G01R 33/02* (2013.01)

(58) Field of Classification Search
CPC ................ G01R 33/12; G01R 33/0076; G01R 33/0094; G01R 33/02
See application file for complete search history.

(56) References Cited

U.S. PATENT DOCUMENTS

| | | | |
|---|---|---|---|
| 2002/0197739 A1* | 12/2002 | Prinz .................... | G11C 11/15 436/526 |
| 2008/0184795 A1* | 8/2008 | Woodard ............ | G01R 33/1223 73/304 C |
| 2013/0038321 A1* | 2/2013 | Suzuki ............... | G01R 33/0035 324/225 |
| 2018/0340825 A1* | 11/2018 | Suzara ................ | G01J 3/42 |
| 2022/0221529 A1* | 7/2022 | Miyazaki ............ | G01V 3/081 |

\* cited by examiner

*Primary Examiner* — Alvaro E Fortich
(74) *Attorney, Agent, or Firm* — Edell, Shapiro & Finnan, LLC

(57) ABSTRACT

Provided is a magnetic moment measurement system and method, which belong to the technical field of magnetic moment measurement, and solve the problems of insufficient accuracy, low efficiency, and vulnerability to disturbance from an external magnetic field in the existing magnetic moment measurement technique. The magnetic moment measurement method includes the following steps: acquiring a magnetic field vector and a magnetic gradient tensor at a center of a magnetic sensor array through the magnetic sensor array; calculating an angle of a magnetic moment vector; and according to the angle of the magnetic moment vector, selecting a corresponding magnetic moment inversion formula, and calculating the magnetic moment vector. By constructing the magnetic sensor array, and using the advanced inversion algorithm, this application not only significantly improves the magnetic moment measurement accuracy, but also greatly shortens the measurement cycle, simplifies the measurement system, and reduces the measurement error.

14 Claims, 7 Drawing Sheets

MAGNETIC MOMENT MEASUREMENT SYSTEM AND METHOD

CROSS REFERENCE TO RELATED APPLICATION

This patent application claims the benefit and priority of Chinese Patent Application No. 202510115828X, filed with the China National Intellectual Property Administration on Jan. 24, 2025, the disclosure of which is incorporated by reference herein in its entirety as part of the present application.

TECHNICAL FIELD

The present disclosure relates to the technical field of magnetic moment measurement, and in particular to a magnetic moment measurement system and method.

BACKGROUND

Gravitational wave detection is an important method to observe cosmic events and reveal the origins of the universe. Many countries have launched gravitational wave detection programs, such as the "laser interferometer space antenna (LISA)" led by the European Space Agency (ESA) and the Japan's "Deci-hertz Interferometer Gravitational Wave Observatory (DECIGO)". The "LISA" has been listed as one of the highest-priority tasks in the "Cosmic Vision 2015-2025 Program" of the ESA. In space exploration, a residual magnetic moment of a core component in the detector will interact with a space magnetic field to generate a magnetic torque. For the sake of high-precision detection on gravitational waves, the residual magnetic moment of the core component is not greater than 20 nA·m$^2$ (equivalent to magnetism generated by 1 μg ferromagnetic particles), ensuring that acceleration noise arising from the magnetic torque is not greater than 24% of total noise. However, in fabrication of the core component (with the mass in kilograms (kg) and dimensions in centimeters (cm)), ferromagnetic impurities are unavoidably introduced. Hence, to ensure accurate detection on the gravitational waves, it is essential to precisely measure the magnetic moment of the core component.

The commercial vibrating sample magnetometers (VSMs) offer a precision of 0.05 nA·m$^2$ in magnetic moment measurement, but they are only applicable to samples in grams (g). For magnetic moments of kg-scale materials, such as the core component of the gravitational wave detector, there are mainly a mechanical measurement method and a magnetic measurement method.

The mechanical measurement method has the following principle: A millitesla (mT)-scale excitation magnetic field is generated with a coil. A torque resulting from interaction between the magnetic field and the to-be-measured material is measured. The magnetic moment is obtained by inversion according to mechanical formulas. Research institutions worldwide mainly make use of a high-sensitivity torsion pendulum device to measure the torque, achieving desirable measurement results. However, the method has many drawbacks: The measurement results are affected by fluctuation of the geomagnetic field. The to-be-measured material is magnetized by the excitation magnetic field to affect the measurement result. The measurement cycle is long, lasting about two weeks.

The principle of the magnetic measurement method is as follows: A magnetic field distribution of the to-be-measured material in the space is measured with a magnetic sensor array. The magnetic moment is obtained by inversion according to a mathematical relationship between the magnetic moment and the magnetic field distribution. Research institutions worldwide typically measure a magnetic field vector of the to-be-measured material in the geomagnetic field, and solve a nonlinear equation with an optimization algorithm to obtain the magnetic moment. Due to instability and inhomogeneity of the geomagnetic field, the measurement accuracy of this method is greatly affected.

SUMMARY

The present disclosure provides a magnetic moment measurement system and method, to solve the problems of an inaccurate measurement result due to a fact that a core component is magnetized by an excitation magnetic field, a long measurement cycle for about two weeks, a complex measurement system, and a hard-to-evaluate measurement error in the existing mechanical measurement method, and the problem of insufficient measurement accuracy in the existing magnetic measurement method.

The present disclosure provides a magnetic moment measurement system, including a non-magnetic guide rail, a non-magnetic slider, a non-magnetic support platform, a magnetic sensor array, a magnetic shielding device, and a computer, where the non-magnetic guide rail, the non-magnetic slider, the non-magnetic support platform, and the magnetic sensor array are located in the magnetic shielding device; a lower surface of the non-magnetic slider is slidably connected to the non-magnetic guide rail; the non-magnetic guide rail is fixed on the non-magnetic support platform; the magnetic sensor array is fixed on an upper surface of the non-magnetic support platform; and an output terminal of the magnetic sensor array is in communication connection with a signal input terminal of the computer; and in response to magnetic moment measurement, a to-be-measured material is placed on the non-magnetic slider; and the to-be-measured material is moved through the non-magnetic guide rail.

Further, the non-magnetic slider is configured to drag the to-be-measured material along the non-magnetic guide rail to move;

the magnetic sensor array is constructed by a plurality of magnetic sensors in an array, and configured to acquire a magnetic field strength generated by the to-be-measured material;

the magnetic shielding device is configured to shield magnetic disturbance of an external environment; and the computer has a built-in data acquisition and inversion algorithm, and is configured to acquire a magnetic field strength output by the magnetic sensor array, and calculate a magnetic moment vector.

The present disclosure provides a magnetic moment measurement method, which is based on the magnetic moment measurement system, and includes the following steps:

S100: acquiring a magnetic field vector and a magnetic gradient tensor at a center of the magnetic sensor array through the magnetic sensor array.

S200: calculating an angle of the magnetic moment vector; and

S300: according to the angle of the magnetic moment vector, selecting a corresponding magnetic moment inversion formula, and calculating the magnetic moment vector.

Further, the step S100 includes:

S110: arranging the plurality of magnetic sensors according to a geometric structure to form the magnetic sensor array;

S120: placing the to-be-measured material on the non-magnetic slider, and allowing the to-be-measured material to stand for a period of time;

S130: measuring, through the magnetic sensor array, a magnetic field generated by the to-be-measured material to obtain the magnetic field vector at the center of the magnetic sensor array, the magnetic field vector including readings of the magnetic sensors in an X direction, a Y direction, and a Z direction;

S140: moving away the to-be-measured material through the non-magnetic slider, to obtain a step change of the magnetic field before and after the to-be-measured material is moved away; and S150: calculating the magnetic gradient tensor G with a differential method.

Further, the step S200 includes:

S210: performing singular value decomposition (SVD) on the magnetic gradient tensor G to obtain decomposed matrices U, S and V;

S220: calculating a pseudo-inverse matrix $S^+$ of the matrix S;

S230: calculating an initial value $r_I$ of a position vector with the decomposed matrix U, the decomposed matrix V, the pseudo-inverse matrix $S^+$ and the magnetic gradient tensor G;

S240: calculating an initial value $m_I$ of the magnetic moment vector according to the initial value of the position vector; and S250: calculating the angle of the magnetic moment vector φ according to initial value $m_I$ of the magnetic moment vector.

The present disclosure provides a storage medium, where the storage medium stores a computer program, and the computer program is configured to implement, when executed by a processor, the above magnetic moment measurement method.

The present disclosure provides a computer device, including a memory, a processor, and a computer program that is stored in the memory and executable on the processor, where the processor is configured to execute the computer program to implement the above magnetic moment measurement method.

Compared with the prior art, the present disclosure has the following beneficial effects: By constructing the magnetic sensor array, and using the advanced data processing and inversion algorithm, the magnetic moment measurement system and method provided by the present disclosure not only significantly improve the magnetic moment measurement accuracy to 1.48 nA·m² to 1.74 nA·m², but also greatly shorten the measurement cycle, simplify the measurement system, and reduce the measurement error. Besides, the present disclosure further verifies the accuracy and universality of the method through simulation and experiments, and is particularly applied to the field of gravitational wave detection, providing an important technical support for high-precision scientific experiments.

BRIEF DESCRIPTION OF THE DRAWINGS

FIG. 2A is a regular triangular array structure, FIG. 2B is a cross-shaped array structure, FIG. 2C is a square array structure, and FIG. 2D is a regular tetrahedral array structure;

FIG. 5A is a full-orientation distribution of the e in response to the magnetic moment $m_t$=19.64 nA·m², FIG. 5B is a full-orientation distribution of the e in response to the magnetic moment $m_t$=39.27 nA·m², and FIG. 5C is a full-orientation distribution of the e in response to the magnetic moment $m_t$=58.91 nA·m².

DETAILED DESCRIPTION OF THE EMBODIMENTS

The technical solutions in the embodiments of the present disclosure are described clearly and completely below with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

Figure 1:
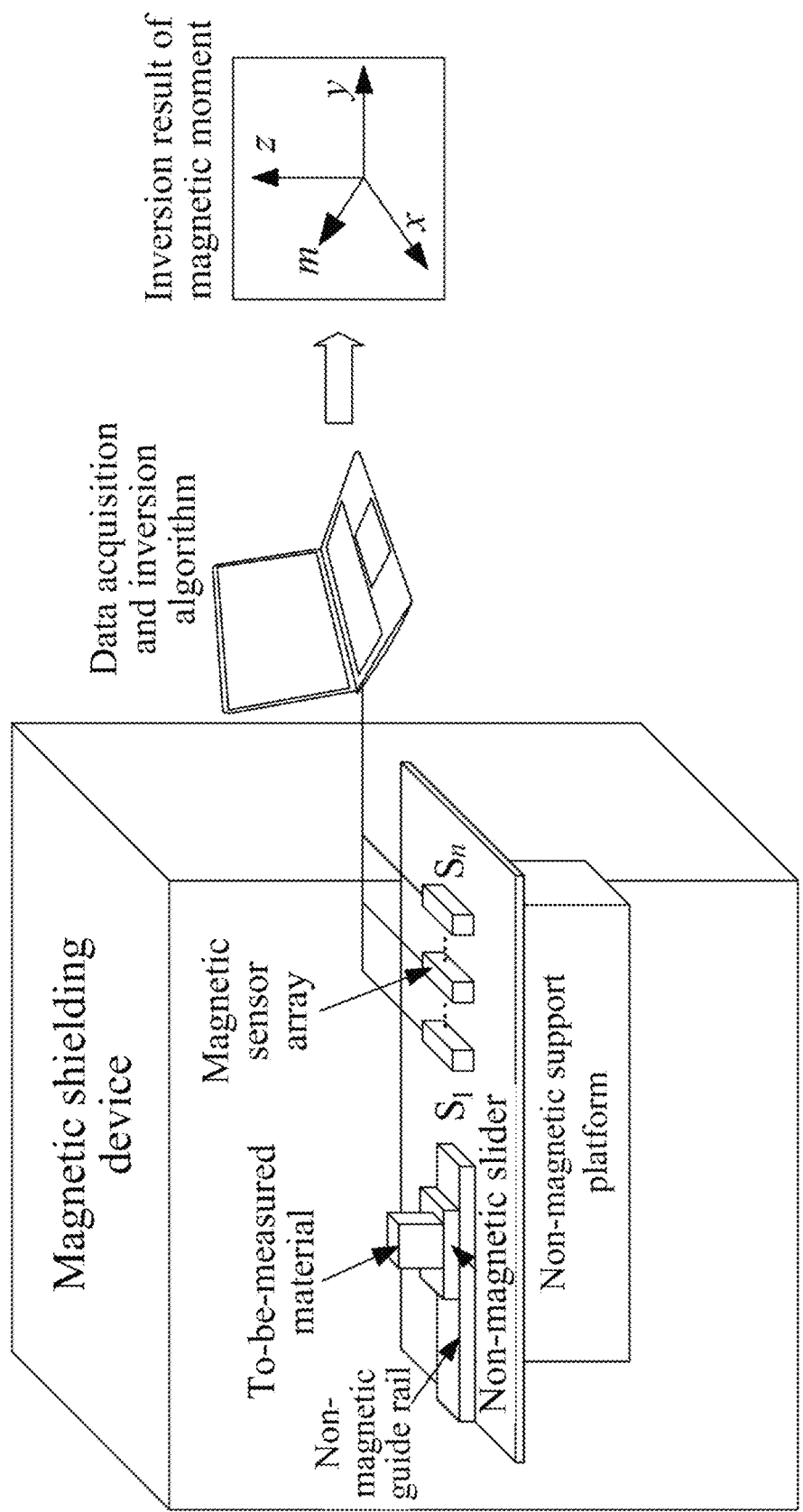
FIG. 1 is a schematic diagram of a magnetic moment measurement system according to the present disclosure.
Figure 2A:
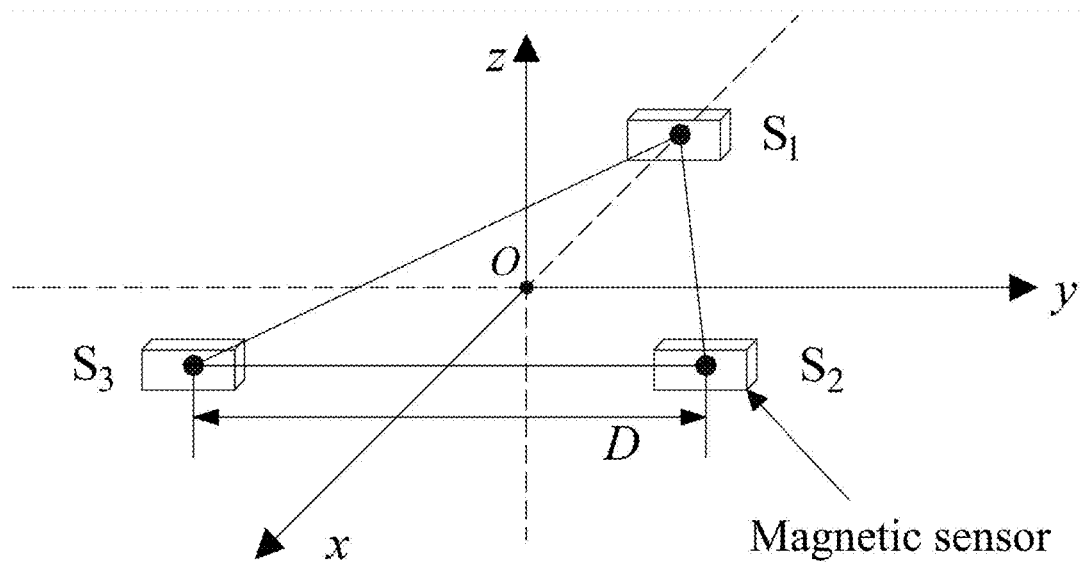
FIGS. 2A-2D illustrates an array structure for measuring an magnetic gradient tensor, where
Figure 2B:
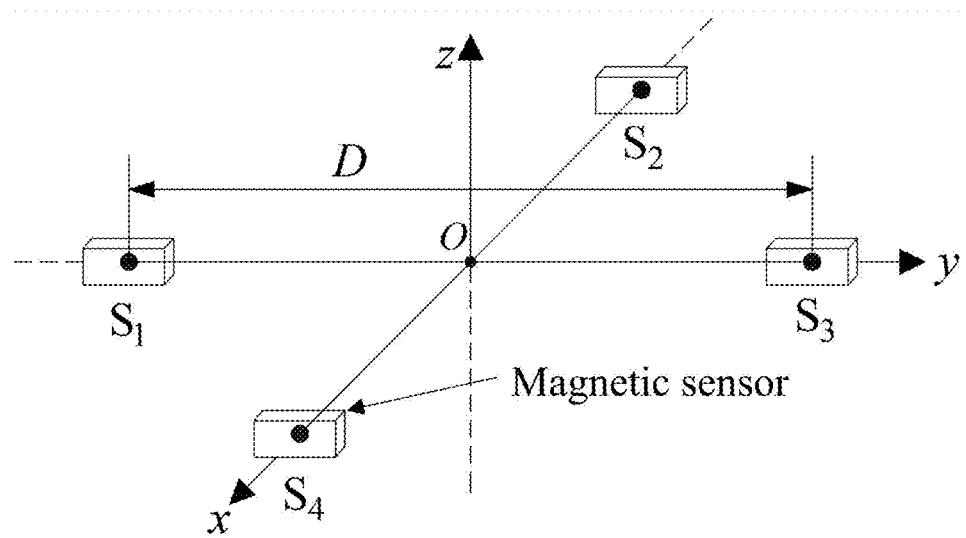
Figure 2C:
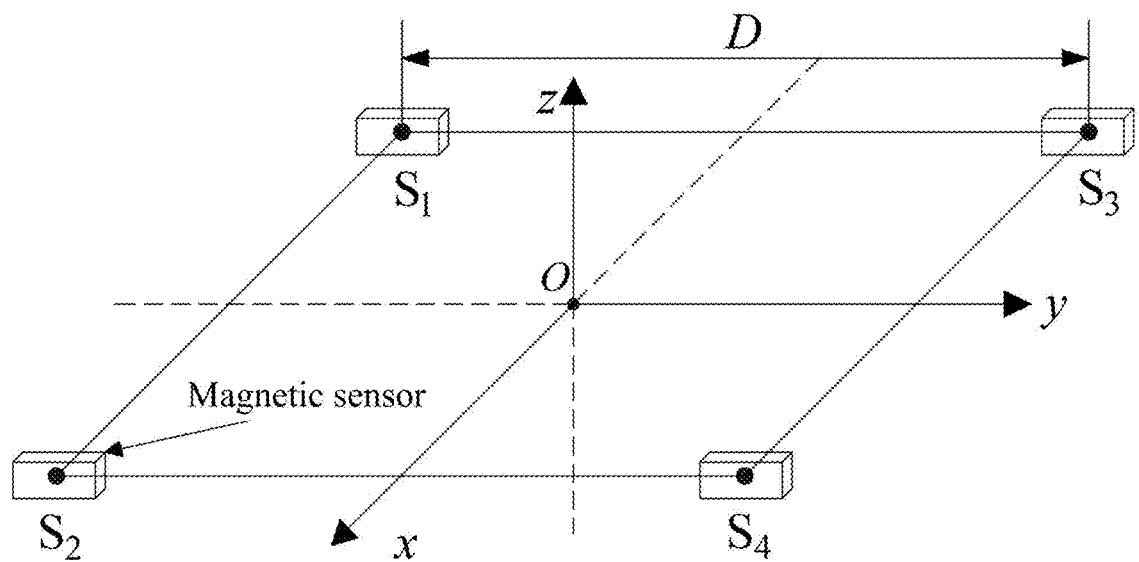
Figure 2D:
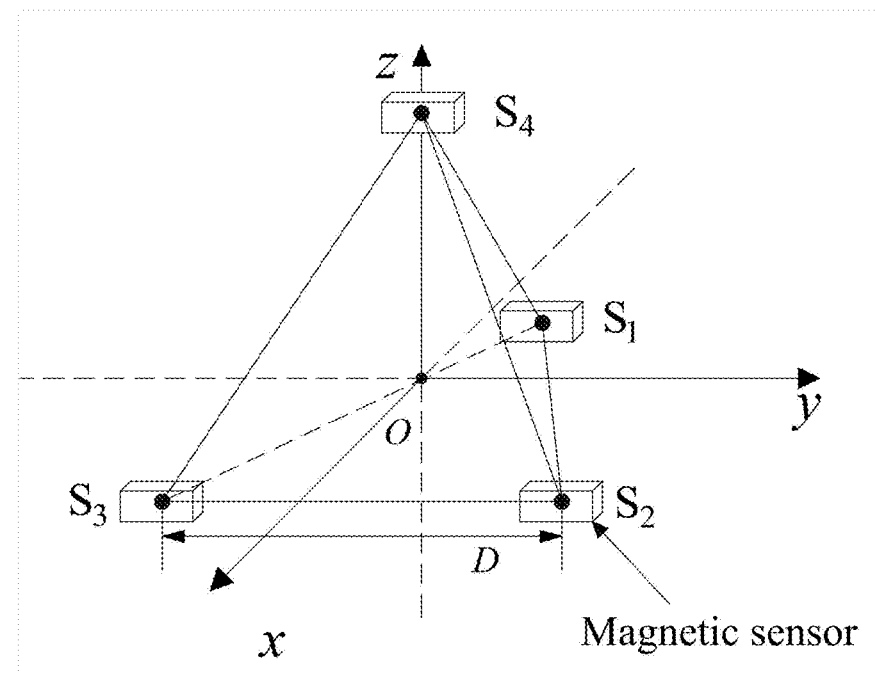

Referring to FIG. 1, the present disclosure provides a magnetic moment measurement system. The magnetic moment measurement system includes a non-magnetic guide rail, a non-magnetic slider, a non-magnetic support platform, a magnetic sensor array, a magnetic shielding device, and a computer. The non-magnetic guide rail, the non-magnetic slider, the non-magnetic support platform, and the magnetic sensor array are located in the magnetic shielding device. A lower surface of the non-magnetic slider is slidably connected to the non-magnetic guide rail. The non-magnetic guide rail is fixed on the non-magnetic support platform. The magnetic sensor array is fixed on an upper surface of the non-magnetic support platform. An output terminal of the magnetic sensor array is in communication connection with a signal input terminal of the computer.

In response to magnetic moment measurement, a to-be-measured material is placed on the non-magnetic slider. The to-be-measured material is moved through the non-magnetic guide rail.

Specifically, the magnetic moment measurement system provided by the present disclosure measures the magnetic moment at high efficiency and high accuracy through well-designed component configuration and operating process. The magnetic moment measurement system provided by the present disclosure includes the non-magnetic slider, the non-magnetic support platform, the magnetic sensor array, the magnetic shielding device, and the computer. The non-magnetic slider and the non-magnetic support platform ensure that the to-be-measured material can move in a non-magnetic environment, reducing disturbance of an external environment. The magnetic sensor array is fixed on the non-magnetic support platform, which can accurately capture a change of a magnetic field generated by the to-be-measured material. The magnetic shielding device further isolates influences from an ambient magnetic field. The computer can quickly obtain an accurate measurement result of the magnetic moment according to data input by the magnetic sensor array.

A pulling rope can be used by the non-magnetic slider. Pulling the non-magnetic slider outside the magnetic shielding device drives the to-be-measured material to move.

Further, the non-magnetic slider is configured to drag the to-be-measured material along the non-magnetic guide rail to move.

The magnetic sensor array is constructed by a plurality of magnetic sensors in an array, and configured to acquire a magnetic field strength generated by the to-be-measured material.

The magnetic shielding device is configured to shield the magnetic disturbance of the external environment.

The computer has a built-in data acquisition and inversion algorithm, and is configured to acquire a magnetic field strength output by the magnetic sensor array, and calculate a magnetic moment vector.

Specifically, by integrating the non-magnetic slider, the magnetic sensor array, the magnetic shielding device, and the computer with the built-in data acquisition and inversion algorithm, the magnetic moment measurement system provided by the present disclosure measures the magnetic moment efficiently and accurately. With the non-magnetic slider, the to-be-measured material moves accurately in the non-magnetic environment, ensuring controllability of the measurement process. The magnetic sensor array arranged in the array can comprehensively capture the magnetic field strength generated by the to-be-measured material, providing abundant magnetic field data. The magnetic shielding device effectively isolates the disturbance of the external magnetic field, ensuring the accuracy of the measurement result. The computer not only acquires data on the magnetic field strength, but also processes the data through the built-in inversion algorithm, thereby accurately calculating the magnetic moment vector. While improving the degree of automation of the measurement, and reducing the artificial error, such a systematic design improves the data processing efficiency and accuracy, and is particularly applied to scientific research and industrial applications needing high-precision magnetic moment measurement, such as the gravitational wave detection.

The present disclosure provides a magnetic moment measurement method, which is based on the magnetic moment measurement system, and includes the following steps:

S100: A magnetic field vector and a magnetic gradient tensor at a center of the magnetic sensor array are acquired through the magnetic sensor array.

S200: An angle of the magnetic moment vector is calculated.

S300: According to the angle of the magnetic moment vector, a corresponding magnetic moment inversion formula is selected, and the magnetic moment vector is calculated.

Specifically, the present disclosure makes use of the magnetic sensor array to capture the magnetic moment vector and the magnetic gradient tensor at the center of the system, providing basic data for subsequent calculation. Then, the angle of the magnetic moment vector is calculated, providing a basis to select the appropriate magnetic moment inversion formula. At last, according to the angle of the magnetic moment vector, the appropriate inversion formula is selected, and the magnetic moment vector is calculated accurately. This not only improves the automation and accuracy of the measurement, but also optimizes the data processing procedures, reduces the measurement error, and makes the measurement result more reliable. Besides, without reliance on complex external conditions, the method has desirable universality and practicability.

Further, the step S100 includes:

S110: The plurality of magnetic sensors are arranged according to a geometric structure to form the magnetic sensor array.

S120: The to-be-measured material is placed on the non-magnetic slider, and allowed to stand for a period of time.

S130: A magnetic field generated by the to-be-measured material is measured through the magnetic sensor array to obtain the magnetic field vector at the center of the magnetic sensor array, the magnetic field vector including readings of the magnetic sensors in an X direction, a Y direction, and a Z direction.

S140: The to-be-measured material is moved away through the non-magnetic slider, to obtain a step change of the magnetic field before and after the to-be-measured material is moved away.

S150: The magnetic gradient tensor G is calculated with a differential method.

Specifically, the to-be-measured material is placed at a designated position, and allowed to stand for a period of time. The to-be-measured material is moved away through the non-magnetic slider. Through the step change of the magnetic field before and after the to-be-measured material is moved away, the magnetic field vector generated by the to-be-measured material is obtained.

After measured data of each magnetic sensor on the magnetic field vector is obtained, the magnetic gradient tensor G is calculated with the differential method. G is a gradient of the magnetic field vector B in three spatial directions, and is a 3×3 matrix.

$$G = \begin{bmatrix} \partial B_x/\partial x & \partial B_x/\partial y & \partial B_x/\partial z \\ \partial B_y/\partial x & \partial B_y/\partial y & \partial B_y/\partial z \\ \partial B_z/\partial x & \partial B_z/\partial y & \partial B_z/\partial z \end{bmatrix} = \begin{bmatrix} G_{xx} & G_{xy} & G_{xz} \\ G_{yx} & G_{yy} & G_{yz} \\ G_{zx} & G_{zy} & G_{zz} \end{bmatrix} \quad (1)$$

In a detection area without a spatial current density, both the divergence and curl of the magnetic field are 0, and the magnetic gradient tensor G exhibits symmetry and tracelessness, namely:

$$\begin{cases} G_{xy} = G_{yx} \\ G_{xz} = G_{zx} \\ G_{yz} = G_{zy} \\ G_{xx} + G_{yy} + G_{zz} = 0 \end{cases} \quad (2)$$

$G_{xx}$, $G_{xy}$, $G_{xz}$, $G_{yy}$, and $G_{yz}$ are independent components of the G. In response to different structures of the magnetic sensor array, the G is calculated with different formulas. The structures of the magnetic sensor array for measuring the G mainly include a square structure, a cross-shaped structure, a triangular structure, and a regular tetrahedral structure, as shown in FIGS. 2A-2D.

With the square array structure for example, the independent component $G_{xx}$ is calculated by Formula (3), and the other four independent components are calculated similarly.

$$G_{xx} = \frac{B_d^{1x} + B_d^{2x} - B_d^{3x} - B_d^{4x}}{2D} \quad (3)$$

In the foregoing formula, D is a baseline distance of the magnetic sensor array, and $B_d^{ix}$ (i=1, 2, 3, 4) is an x-axis magnetic field data of the magnetic sensor $S_i$.

Further, the step S200 includes:

S210: SVD is performed on the magnetic gradient tensor G to obtain decomposed matrices U, S and V.

S220: A pseudo-inverse matrix $S^+$ of the matrix S is calculated.

S230: An initial value $r_I$ of a position vector is calculated with the decomposed matrix U, the decomposed matrix V, the pseudo-inverse matrix $S^+$ and the magnetic gradient tensor G.

S240: An initial value $m_I$ of the magnetic moment vector is calculated according to the initial value $r_I$ of the position vector.

S250: The angle of the magnetic moment vector $\varphi$ is calculated according to the initial value $m_I$ of the magnetic moment vector.

Specifically, the SVD is performed on the magnetic gradient tensor G first:

$$G = USV = [u_1 \ u_2 \ u_3] \begin{bmatrix} s_1 & & \\ & s_2 & \\ & & s_3 \end{bmatrix} [v_1 \ v_2 \ v_3]^T \quad (4)$$

The matrix $S^+$ is calculated according to Formula (5):

$$S^+ = \begin{cases} \begin{bmatrix} 1/s_1 & & \\ & 1/s_2 & \\ & & 1/s_3 \end{bmatrix}, & s_3/s_2 \geq 0.1 \\ \begin{bmatrix} 1/s_1 & & \\ & 1/s_2 & \\ & & 0 \end{bmatrix}, & s_3/s_2 < 0.1 \end{cases} \quad (5)$$

Then, the initial value $r_I$ of the position vector is calculated according to Formula (6):

$$r_I = 3G^+ B_0 = \frac{3VS^+ U^T}{4} \cdot (B_1 + B_2 + B_3 + B_4) \quad (6)$$

Next, the initial value $m_I$ of the magnetic moment vector is calculated according to Formula (7):

$$\begin{cases} m_I = [m_x \ m_y \ m_z]^T = (A^T \cdot A)^{-1} A^T \cdot [G_{xx} \ G_{yx} \ G_{zx} \ G_{yy} \ G_{zy}]^T \quad (7) \\ A = \begin{bmatrix} 3x_0 r^2 - 5(x_0)^3 & y_0 r^2 - 5y_0(x_0)^2 & z_0 r^2 - 5z_0(x_0)^2 \\ y_0 r^2 - 5y_0(x_0)^2 & x_0 r^2 - 5x_0(y_0)^2 & -5x_0 y_0 z_0 \\ z_0 r^2 - 5z_0(x_0)^2 & -5x_0 y_0 z_0 & x_0 r^2 - 5x_0 z_0^2 \\ x_0 r^2 - 5x_0(y_0)^2 & 3y_0 r^2 - 5(y_0)^3 & z_0 r^2 - 5z_0(y_0)^2 \\ -5x_0 y_0 z_0 & z_0 r^2 - 5z_0(y_0)^2 & y_0 r^2 - 5y_0 z_0^2 \end{bmatrix} \end{cases}$$

In the foregoing formula, $x_0$, $y_0$, and $z_0$ are three axial components of the position vector $r_I$.

At last, the angle of the magnetic moment vector $\varphi$ is calculated according to Formula (8):

$$\varphi = \cos^{-1}\left(\frac{r_I \cdot m_I}{\|r_I\| \|m_I\|}\right), \ 0° \leq \varphi \leq 180° \quad (8)$$

Further, in the step S300, the position vector r is calculated according to Formula (9):

$$\begin{cases} r = 3VS^+ U^T, \ \varphi \leq 65° \text{ or } \varphi \geq 115° \\ r = 3V \begin{bmatrix} 1/s_1 & & \\ & 1/s_2 & \\ & & 0 \end{bmatrix} U^T B_0, \ 65° < \varphi \leq 115° \end{cases} \quad (9)$$

The magnetic moment vector m of the to-be-measured material is calculated according to Formula (7).

The present disclosure provides a storage medium. The storage medium stores a computer program. The computer program is configured to implement, when executed by a processor, the above magnetic moment measurement method.

Specifically, the storage medium provided by the present disclosure stores a specific computer program, such that the processor can execute the magnetic moment measurement method, thereby measuring the magnetic moment efficiently and accurately. The storage medium has the following beneficial effects: It can encapsulate complex measurement procedures and algorithms to executable software, facilitating deployment and use on different computing devices. It improves the automation level of the magnetic moment measurement, reduces the complexity and error rate of artificial operation, and ensures the consistency and repeatability of the measurement process. Besides, the storage medium is updated and maintained conveniently, and can be easily integrated with latest measurement techniques and algorithms to accommodate ever-changing measurement requirements and improve the measurement accuracy. The storage medium is particularly applied to the scientific research field, industrial field and educational field, and provides a flexible and reliable solution for the high-precision magnetic moment measurement.

The present disclosure provides a computer device, including a memory, a processor, and a computer program that is stored in the memory and executable on the processor. The processor is configured to execute the computer program to implement the above magnetic moment measurement method.

Specifically, with the memory, the processor, and the specific computer program, the computer device provided by the present disclosure provides an efficient solution to realize the magnetic moment measurement method. The computer device has the following beneficial effects: First of all, by programming the magnetic moment measurement method, the computer device can automatically execute the complex measurement procedures, significantly improving the accuracy and repeatability of the measurement. Then, with programmability of the computer program, the measurement method can be easily updated and optimized to accommodate different measurement requirements and improve the measurement technique. Besides, the device is operated and maintained easily, reducing the reliance on professional operators and the barrier to adoption. At last, with the computer device, the magnetic moment measurement can be flexibly deployed in various environments, making the measurement more convenient and efficient. In general, the device provides a reliable, efficient and easy-to-use magnetic moment measurement tool for scientific researchers and engineers, and is particularly applied to high-precision scientific experiments and industrial applications.

The following is a specific embodiment of the present disclosure:

With finite element software Comsol, the magnetic field of the uniformly magnetized mass at the magnetic sensor array is calculated. In the simulation, the tested mass is uniformly magnetized. The relative permeability $\mu_r$ is 1.00001, the electrical conductivity is $9\times10^6$ S/m, and the geometric dimensions are 0.050 m×0.050 m. Compact high-sensitivity atomic magnetometers (QZFM Gen-3, Quspin Inc.) are used as the magnetic sensors to measure the magnetic field generated by the tested mass. The atomic magnetometers have a resolution of 0.002 pT. The tested mass is placed at the position $[0.07 \text{ m}, 0 \text{ m}, 0.07 \text{ m}]^T$, with the magnetic moment being 20 nA·m². The standard deviation of environmental magnetic noise is 40 fT. Simulation parameters are as shown in Table 1.

TABLE 1

| Parameter | $r_x$ (m) | $r_y$ (m) | $r_z$ (m) | M (nA · m²) | D (m) | S (fT) | σ (fT) |
|---|---|---|---|---|---|---|---|
| Value | 0.07 | 0 | 0.07 | 20 | 0.02 | 2 | 40 |

The magnetic moment error e is used to quantize a deviation between the calculated value $m_c$ of the magnetic moment and the theoretical value $m_t$ of the magnetic moment:

$$e=|m_t-m_c| \quad (10)$$

Figure 3:
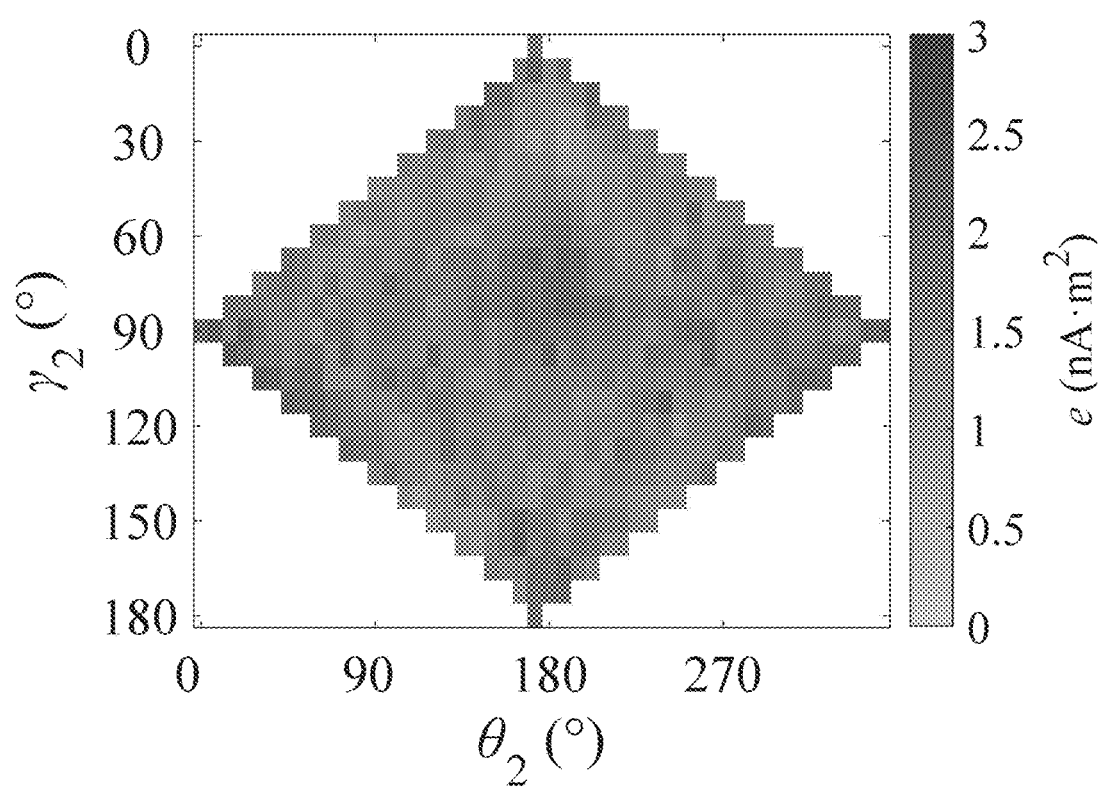
FIG. 3 illustrates magnetic moment measurement errors in different magnetization directions.

The magnetic moment errors e in different magnetization directions are as shown in FIG. 3. As can be observed, for the tested mass in any magnetization direction, the magnetic moment measurement method provided by the present disclosure can accurately measure the magnetic moment of the tested mass, with the measurement accuracy being 1.48 nA·m².

Figure 4:
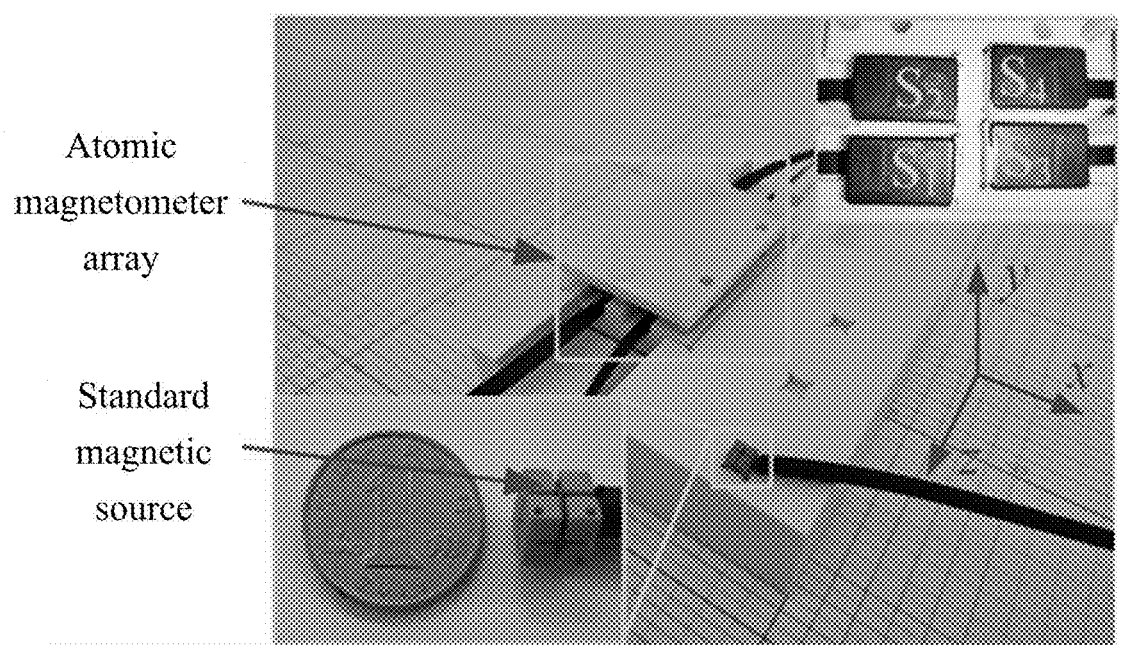
FIG. 4 illustrates a physical photograph of a magnetic moment measurement system according to the present disclosure.

In order to verify the inversion accuracy of the measurement method, an experimental platform composed of a standard magnetic source and an atomic magnetometer array is established in a magnetic shielding room, as shown in FIG. 4. During the experiment, the theoretical value $m_t$ of the magnetic moment vector is obtained using the standard magnetic source. The standard magnetic source is detected and inverted with the detection and inversion system, thereby determining the inversion accuracy. The m is calculated by:

$$m_t=\pi R^2 \cdot I \quad (11)$$

In the foregoing formula, I is a current vector of a current-carrying circular coil.

The standard magnetic source is a triaxial circular coil structure, with coil radii of 1.9 mm, 3.1 mm, and 2.5 mm for an x-axis coil, a y-axis coil, and a z-axis coil respectively. All three axes are configured with 1 turn and wired in a twisted pair. The coil former of the standard magnetic source is 3D-printed using an imported red wax material, with a dimensional tolerance being 0.05 mm. The lead wire is an enameled copper wire, with a nominal maximum outer diameter being 0.60 mm. The atomic magnetometer array is placed at an origin of the coordinate system through a tool (with a dimensional tolerance of 0.2 mm). The coordinate of the standard magnetic source is [70.0 mm, 0 mm, 70.0 mm] T. The standard magnetic source is powered by a high-precision power supply (Model 6221, Keithley Instruments) at a current resolution of 0.01 nA. A vector direction of the standard magnetic moment is altered by adjusting a current vector. In the experiment, the standard magnetic source has current amplitudes of 1000.000 nA, 2000.000 nA, and 3000.000 nA. The theoretical values $m_t$ of the magnetic moments are respectively 19.64 nA·m², 39.27 nA·m² and 58.91 nA·m² according to Formula (9).

Figure 5A:
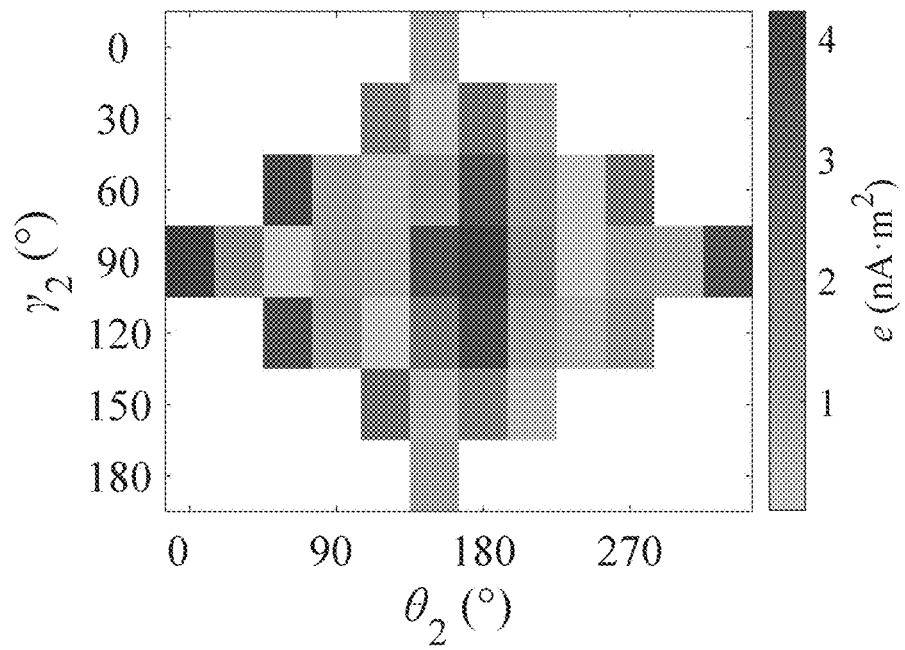
FIGS. 5A-5C illustrates full-orientation distributions of e at different magnetic moments, where
Figure 5B:
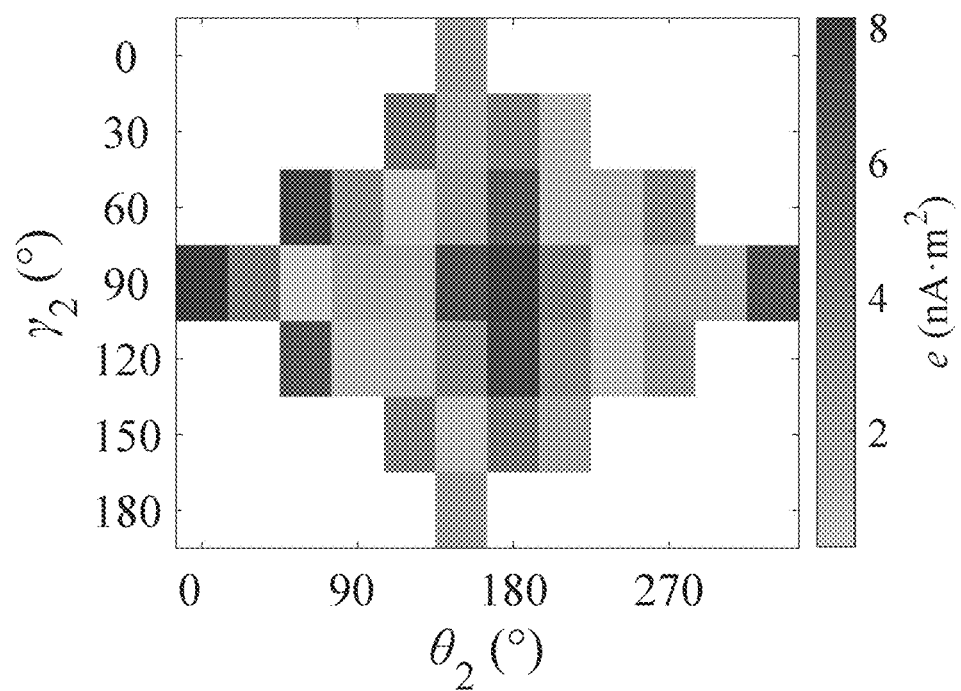
Figure 5C:
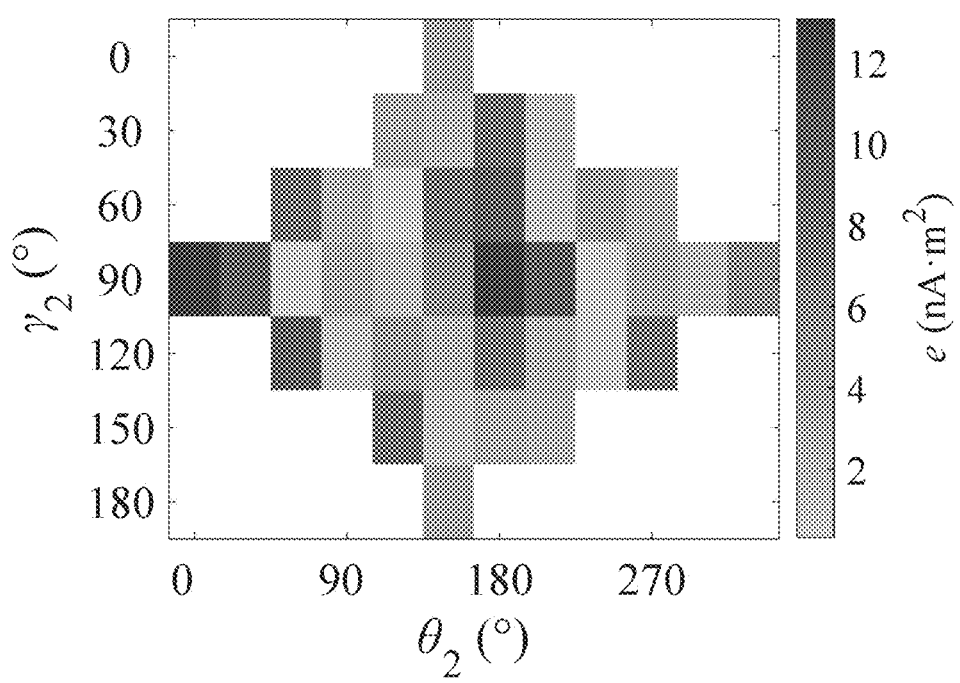

Full-orientation distributions of the magnetic moment errors e at different magnetic moment amplitudes are as shown in FIGS. 5A-5C. The full-orientation inversion accuracy of different magnetic moments is as shown in Table 2. In response to the theoretical value $m_t$=19.64 nA·m² of the magnetic moment, the inversion accuracy of the magnetic moment can be 1.74 nA·m². The experimental result shows that the detection and inversion system can accurately invert the magnetic moment. Besides, the experimental result 1.74 nA·m² is close to the simulation result 1.48 nA·m², demonstrating the accuracy of the magnetic moment measurement method provided by the present disclosure.

TABLE 2

| $m_t$ (nA · m²) | $e_p$ (nA · m²) |
|---|---|
| 19.64 | 1.74 |
| 39.27 | 3.30 |
| 58.91 | 4.66 |

By constructing the magnetic sensor array, and using the advanced data processing and inversion algorithm, the magnetic moment measurement system and method provided by the present disclosure not only significantly improve the magnetic moment measurement accuracy to 1.48 nA·m² to 1.74 nAm², but also greatly shorten the measurement cycle, simplify the measurement system, and reduce the measurement error. Besides, the present disclosure further verifies the accuracy and universality of the method through simulation and experiments, and is particularly applied to the field of gravitational wave detection, providing an important technical support for high-precision scientific experiments.

The foregoing descriptions are merely specific implementations of the present invention, but are not intended to limit the protection scope of the present invention. Any equivalent modification or replacement readily figured out by a person skilled in the art within the technical scope disclosed in the present invention shall fall within the protection scope of the present invention. Therefore, the protection scope of the present disclosure shall be subject to the protection scope of the claims.

What is claimed:

1. A magnetic moment measurement system, comprising a non-magnetic guide rail, a non-magnetic slider, a non-magnetic support platform, a magnetic sensor array, a magnetic shielding device, and a computer, wherein the non-magnetic guide rail, the non-magnetic slider, the non-magnetic support platform, and the magnetic sensor array are located in the magnetic shielding device; a lower surface of the non-magnetic slider is slidably connected to the non-magnetic guide rail; the non-magnetic guide rail is fixed on the non-magnetic support platform; the magnetic sensor array is fixed on an upper surface of the non-magnetic support platform; and an output terminal of the magnetic sensor array is in communication connection with a signal input terminal of the computer;

wherein, in response to a magnetic moment measurement by the system and a to-be-measured material being placed on the non-magnetic slider, the non-magnetic slider moves the to-be-measured material through the non-magnetic guide rail.

2. The magnetic moment measurement system according to claim 1, wherein
the non-magnetic slider is configured to drag the to-be-measured material along the non-magnetic guide rail to move;

the magnetic sensor array comprises a plurality of magnetic sensors in an array, and the magnetic sensory array is configured to acquire a magnetic field strength generated by the to-be-measured material;

the magnetic shielding device is configured to shield magnetic disturbance of an external environment; and the computer has a built-in data acquisition and inversion algorithm, and is configured to acquire a magnetic field strength output by the magnetic sensor array, and calculate a magnetic moment vector.

3. A magnetic moment measurement method that utilizes the magnetic moment measurement system according to claim 1, the method comprising the following steps:

S100: acquiring a magnetic field vector and a magnetic gradient tensor at a center of the magnetic sensor array through the magnetic sensor array;

S200: calculating an angle of the magnetic moment vector; and

S300: according to the angle of the magnetic moment vector, selecting a corresponding magnetic moment inversion formula, and calculating the magnetic moment vector.

4. The magnetic moment measurement method according to claim 3, wherein the step S100 comprises:

S110: arranging the plurality of magnetic sensors according to a geometric structure to form the magnetic sensor array;

S120: placing the to-be-measured material on the non-magnetic slider, and allowing the to-be-measured material to stand for a period of time;

S130: measuring, through the magnetic sensor array, a magnetic field generated by the to-be-measured material to obtain the magnetic field vector at the center of the magnetic sensor array, the magnetic field vector comprising readings of the magnetic sensors in an X direction, a Y direction, and a Z direction;

S140: moving away the to-be-measured material through the non-magnetic slider, to obtain a step change of the magnetic field before and after the to-be-measured material is moved away; and S150: calculating the magnetic gradient tensor G with a differential method.

5. The magnetic moment measurement method according to claim 4, wherein the step S200 comprises:

S210: performing singular value decomposition (SVD) on the magnetic gradient tensor G to obtain decomposed matrices U, S and V;

S220: calculating a pseudo-inverse matrix $S^+$ of the matrix S;

S230: calculating an initial value $r_I$ of a position vector with the decomposed matrix U, the decomposed matrix V, the pseudo-inverse matrix $S^+$ and the magnetic gradient tensor G;

S240: calculating an initial value $m_I$ of the magnetic moment vector according to the initial value $r_I$ of the position vector; and S250: calculating the angle of the magnetic moment vector φ according to the initial value $m_I$ of the magnetic moment vector.

6. A non-transitory computer-readable storage medium, wherein the storage medium stores a computer program, and the computer program is configured to implement, when executed by a processor, the magnetic moment measurement method according to claim 3.

7. A computer device, comprising a memory, a processor, and a computer program that is stored in the memory and executable on the processor, wherein the processor is configured to execute the computer program to implement the magnetic moment measurement method according to claim 3.

8. The magnetic moment measurement method according to claim 3, wherein the non-magnetic slider is configured to drag the to-be-measured material along the non-magnetic guide rail to move;

the magnetic sensor array is constructed by a plurality of magnetic sensors in an array, and configured to acquire a magnetic field strength generated by the to-be-measured material;

the magnetic shielding device is configured to shield magnetic disturbance of an external environment; and the computer has a built-in data acquisition and inversion algorithm, and is configured to acquire a magnetic field strength output by the magnetic sensor array, and calculate a magnetic moment vector.

9. A non-transitory computer-readable storage medium, wherein the storage medium stores a computer program, and the computer program is configured to implement, when executed by a processor, the magnetic moment measurement method according to claim 4.

10. A non-transitory computer-readable storage medium, wherein the storage medium stores a computer program, and the computer program is configured to implement, when executed by a processor, the magnetic moment measurement method according to claim 5.

11. A non-transitory computer-readable storage medium, wherein the storage medium stores a computer program, and the computer program is configured to implement, when executed by a processor, the magnetic moment measurement method according to claim 8.

12. A computer device, comprising a memory, a processor, and a computer program that is stored in the memory and executable on the processor, wherein the processor is configured to execute the computer program to implement the magnetic moment measurement method according to claim 4.

13. A computer device, comprising a memory, a processor, and a computer program that is stored in the memory and executable on the processor, wherein the processor is configured to execute the computer program to implement the magnetic moment measurement method according to claim 5.

14. A computer device, comprising a memory, a processor, and a computer program that is stored in the memory and executable on the processor, wherein the processor is configured to execute the computer program to implement the magnetic moment measurement method according to claim 8.

* * * * *